United States Patent
Thorn et al.

(10) Patent No.: US 10,092,934 B2
(45) Date of Patent: Oct. 9, 2018

(54) SYSTEM AND METHOD FOR CLEANING PNEUMATIC CONVEY LINES

(71) Applicant: Schenck Process LLC, North Kansas City, MO (US)

(72) Inventors: Jonathan O. Thorn, Kansas City, MO (US); Russell A. Heinen, Lawrence, KS (US)

(73) Assignee: Schenck Process LLC, Kansas City, MO (US)

( * ) Notice: Subject to any disclaimer, the term of this patent is extended or adjusted under 35 U.S.C. 154(b) by 0 days.

(21) Appl. No.: 15/584,504

(22) Filed: May 2, 2017

(65) Prior Publication Data

US 2017/0313524 A1 Nov. 2, 2017

Related U.S. Application Data

(60) Provisional application No. 62/330,585, filed on May 2, 2016.

(51) Int. Cl.
| | |
|---|---|
| *B08B 5/00* | (2006.01) |
| *B08B 9/053* | (2006.01) |
| *B08B 9/055* | (2006.01) |
| *F16L 55/46* | (2006.01) |
| *B65G 53/34* | (2006.01) |
| *B65G 53/52* | (2006.01) |

(52) U.S. Cl.
CPC ............... *B08B 5/00* (2013.01); *B08B 9/053* (2013.01); *B08B 9/0557* (2013.01); *F16L 55/46* (2013.01); *B65G 53/34* (2013.01); *B65G 53/521* (2013.01); *B65G 2201/0291* (2013.01)

(58) Field of Classification Search
CPC ........ E03C 1/302; B08B 9/053; B08B 9/0557; F16L 55/26; F16L 55/28; F16L 55/30; F16L 55/32; F16L 55/34; F16L 55/36; F16L 55/38; F16L 55/40; F16L 55/46; F16L 55/48
See application file for complete search history.

(56) References Cited

U.S. PATENT DOCUMENTS

| | | | | |
|---|---|---|---|---|
| 3,125,116 | A * | 3/1964 | Schaberg | F16L 55/46 137/268 |
| 3,779,270 | A * | 12/1973 | Davis | F16L 55/46 137/268 |
| 4,413,370 | A | 11/1983 | Payne et al. | |
| 4,653,134 | A * | 3/1987 | Ando | B08B 9/0558 15/104.061 |

(Continued)

*Primary Examiner* — William R Harp
(74) *Attorney, Agent, or Firm* — Hovey Williams LLP

(57) ABSTRACT

A cleaning system for cleaning a pneumatic conveyance system used to transport particulate material. The pneumatic conveyance system includes a material-introduction device for introducing particulate material into a convey line, and a motive air source for generating an air flow to propel the particulate material through the convey line. The cleaning system comprises a projectile comprising a cleaning surface for cleaning an interior of the convey line as the projectile travels through the convey line, a launcher for injecting the projectile into the convey line, with the launcher being coupled with the convey line at a position upstream from the material-introduction device, and a catcher vessel for receiving the projectile upon said projectile exiting the convey line.

22 Claims, 11 Drawing Sheets

(56) References Cited

U.S. PATENT DOCUMENTS

| | | | |
|---|---|---|---|
| 5,208,937 A | 5/1993 | Cooper | |
| 6,067,682 A | 5/2000 | Rankin | |
| 6,183,216 B1 * | 2/2001 | Bachner | B65G 53/523 |
| | | | 417/279 |
| 6,286,540 B1 | 9/2001 | Bonicontro | |
| 6,561,488 B1 | 5/2003 | Walker | |
| 6,925,671 B1 | 8/2005 | Mouton | |
| 9,211,572 B2 * | 12/2015 | Baker | F16L 55/46 |
| 9,636,721 B2 * | 5/2017 | Ovnic | B08B 9/055 |
| 2002/0170599 A1 * | 11/2002 | Disher | B08B 9/055 |
| | | | 137/269 |
| 2014/0251376 A1 | 9/2014 | Baker | |
| 2015/0136240 A1 | 5/2015 | Sundholm | |

* cited by examiner

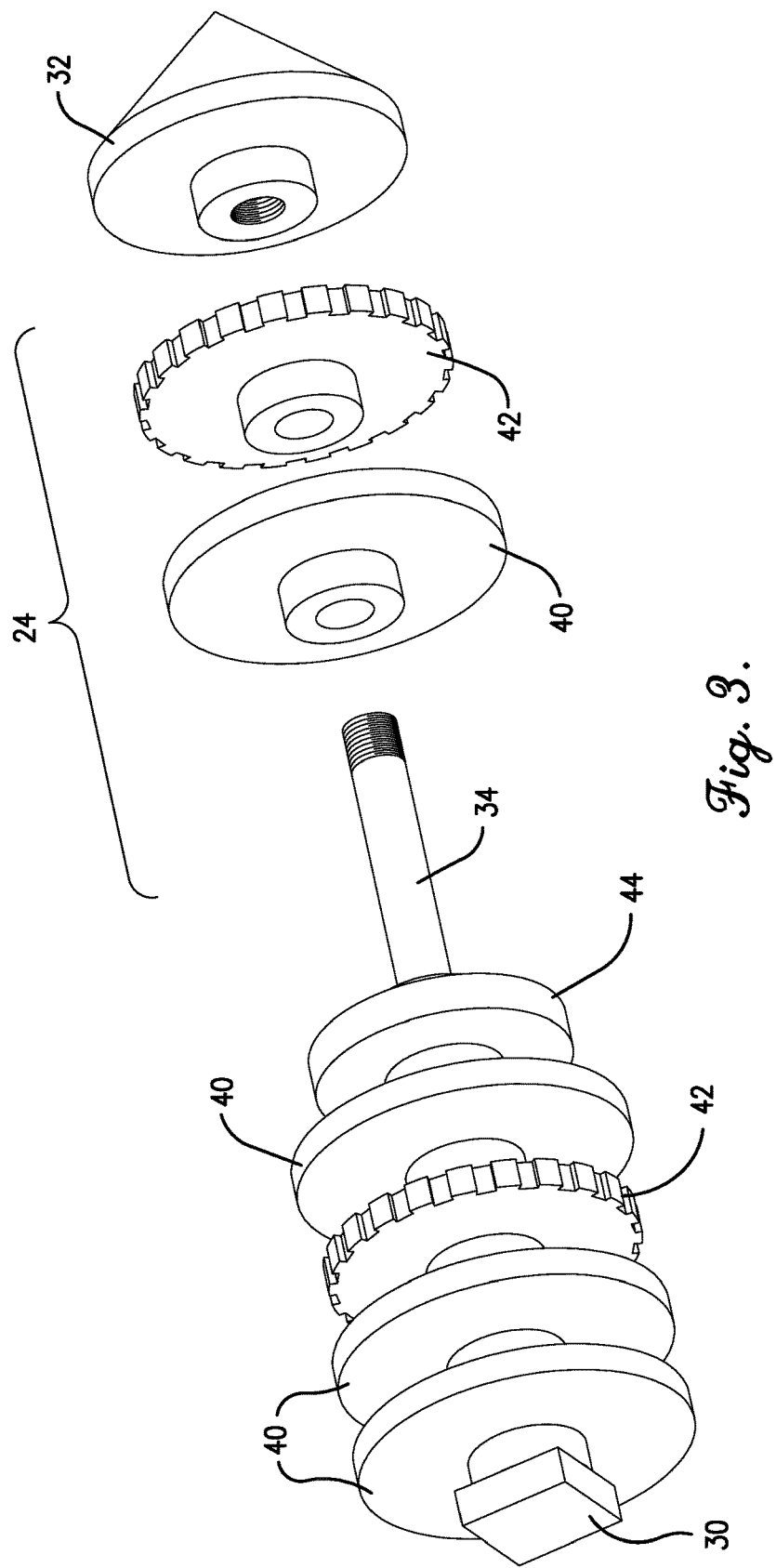

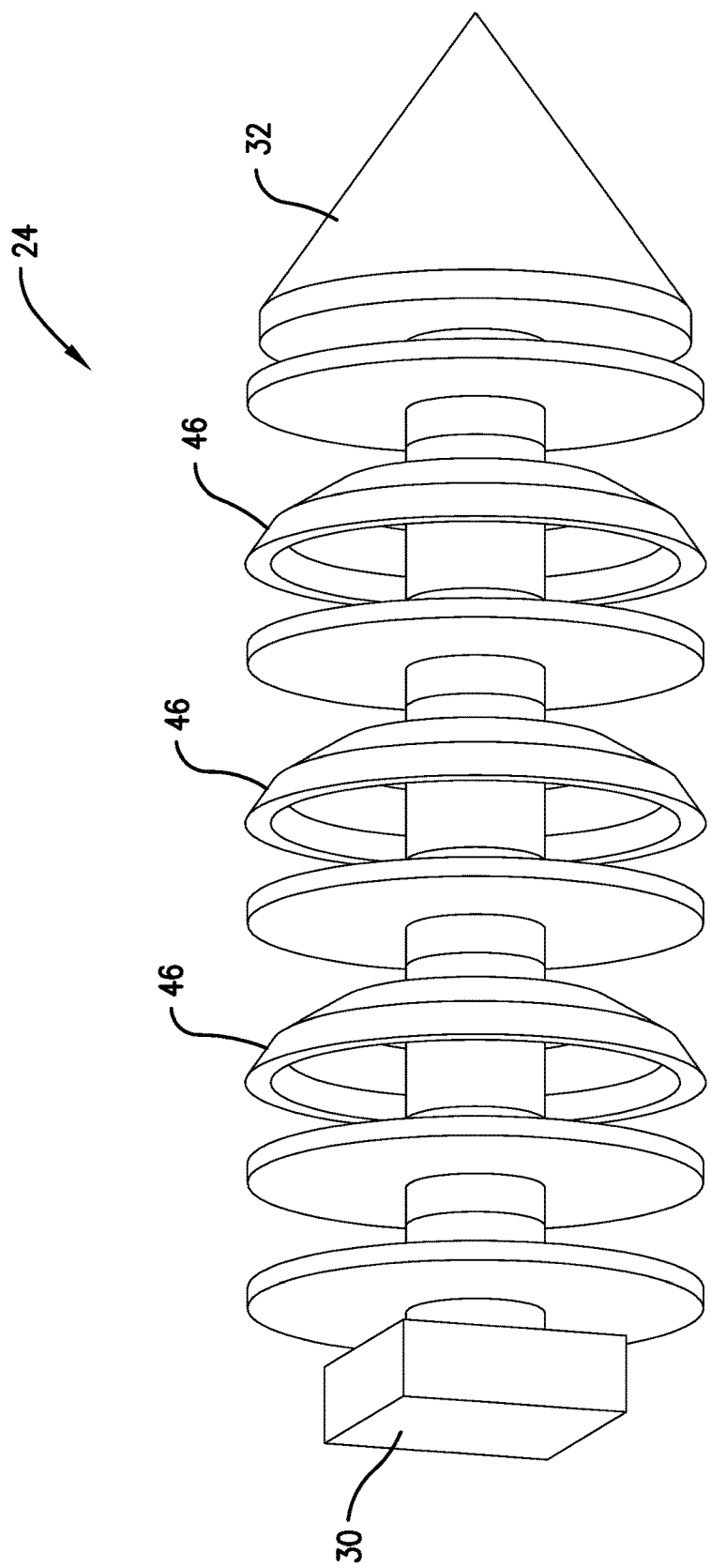

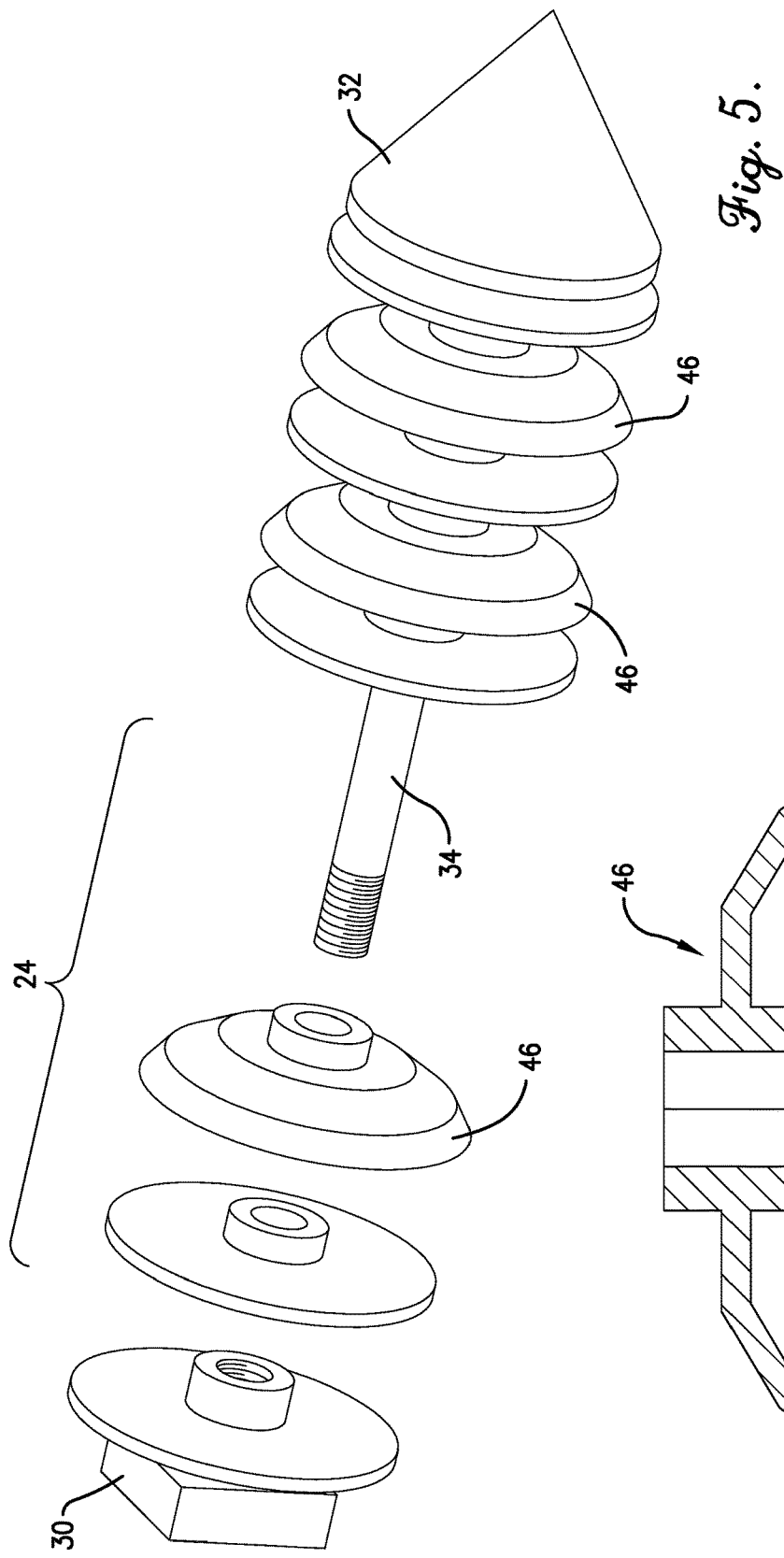

SYSTEM AND METHOD FOR CLEANING PNEUMATIC CONVEY LINES

RELATED APPLICATION

This non-provisional patent application claims priority benefit to U.S. Provisional Patent Application Ser. No. 62/330,585 filed May 2, 2016, and entitled "SYSTEM AND METHOD FOR CLEANING PNEUMATIC CONVEY LINES." The entirety of the above-identified provisional patent application is incorporated by reference into this non-provisional patent application.

FIELD OF THE INVENTION

The present disclosure generally relates to systems and methods for cleaning pneumatic convey lines. In particular, embodiments of the present invention are directed to a pigging-type system and method for cleaning pneumatic convey lines.

BACKGROUND

Pneumatic conveying systems are systems used to transport large quantities of particulate material through convey lines (e.g., conduits, ducts, pipes, or the like). Examples of particulate material include powders, granules, pellets, pet foods, snack foods, seeds, beans, nuts, pasta, and the like. In a common pneumatic conveyance system, a fluid, such as air, is blown into the convey lines to cause the particulate material to travel through the convey lines to a receiver. In particular, the air can be introduced to the convey line, under pressure, via a pressure blower. The particulate material can be introduced into the convey line through a rotary-valve airlock, which is positioned downstream from the pressure blower. Under the force of the air flow, the air and particulate material will travel through the convey line to the receiver positioned at an end of the convey line.

After a period of operation, it is generally necessary to clean an interior of the convey line, as residue from the particulate material, as well as other sediment, contamination, or undesirable material can be present in the convey line. Cleaning is particularly necessary when the particulate material being conveyed is a food product, which is highly susceptible to contamination by bacteria or other contaminants. In some instances, the particulate matter can be caked as a residue on the interior wall of the convey lines. Such caking of residue can be particularly difficult to clean and remove from the convey line.

Various systems currently exist for cleaning convey lines. For example, a "pig" in piping system terminology refers to a projectile that has approximately the same diameter as the internal diameter of a convey line. The pig can be forced through the convey line for purpose of removing contamination, sediment and other undesirable matter. This methodology is widely used in industries such as oil and gas and other liquid pumping processes, and many products exist to facilitate the cleaning of such oil and gas pipelines. However, when dealing with dry, particulate material processed via pneumatic convey lines, currently-used systems and methods are less refined. For example, in pneumatic conveyance systems, the convey line must be opened around a joint area so that a pig can be manually inserted into the convey line. Thereafter, the convey line is closed and the pig can be sent down the convey line in a loosely controlled (or uncontrolled) manner by pressurized air flow from the pressure blower. However, such currently-used systems generally do not include specific component to extract the pig from an end of the convey line. As such, the pig will generally exit the convey line into the same receiver in which the particulate material normally flows. Thereafter, the pig must be retrieved manually from the receiver.

In view of the above, there is a need for a system and method for automated cleaning of a pneumatic conveyance system. For instance, there is a need for a system and method whereby a pig can be introduced to a pneumatic conveying system for the purpose of line cleaning, and then extracted from the system without requiring manual intervention (manual intervention refers to opening convey line joints and/or fishing out projectiles from particular matter receivers). Additionally, there is a need for a cleaning system whereby control of the pig as it travels through the convey line is can be substantially automated. Furthermore there is a need for a pig designed to works efficiently with other components of the cleaning system and, more generally, of the pneumatic conveyance system.

BRIEF SUMMARY

In a first aspect, embodiments of the present invention include a cleaning system for cleaning a pneumatic conveyance system used to transport particulate material. The pneumatic conveyance system includes a material-introduction device for introducing particulate material into a convey line, and a motive air source for generating an air flow to propel the particulate material through the convey line. The cleaning system comprises a projectile comprising a cleaning surface for cleaning an interior of the convey line as the projectile travels through the convey line, a launcher for injecting the projectile into the convey line, with the launcher being coupled with the convey line at a position upstream from the material-introduction device, and a catcher vessel for receiving the projectile upon the projectile traveling through the convey line.

Another aspect of embodiments of the present invention includes a method for cleaning a pneumatic conveyance system used to transport particulate material, with the pneumatic conveyance system including a material-introduction device for introducing particulate material into a convey line, and a motive air source for generating an air flow to propel the particulate material through the convey line and to a receiver. The method comprises the initial step of injecting a projectile into the convey line, with the projectile comprising a cleaning surface for cleaning an interior of the convey line as the projectile travels through the convey line. The projectile is injected via a launcher that is coupled with the convey line at a position upstream from the material-introduction device. The method additionally includes the step of propelling the projectile through the convey line. The method additionally includes the step of diverting the projectile from the receiver to a catcher vessel for receiving the projectile. The method further includes the step of catching the projectile in the catcher vessel.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of embodiments of the present invention. It should be understood that each Figure depicts an embodiment of a particular aspect of the present invention, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

FIG. 3 is a partially exploded view of the pig from FIG. 2;

FIG. 4 is a perspective view of another pig according to embodiments of the present invention, particularly illustrating the pig including cup-shaped motive discs;

FIG. 5 is a is a partially exploded view of the pig from FIG. 4;

FIG. 6 is a cross-section view of a motive disc from the pig of FIG. 4-5;

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

Figure 1:
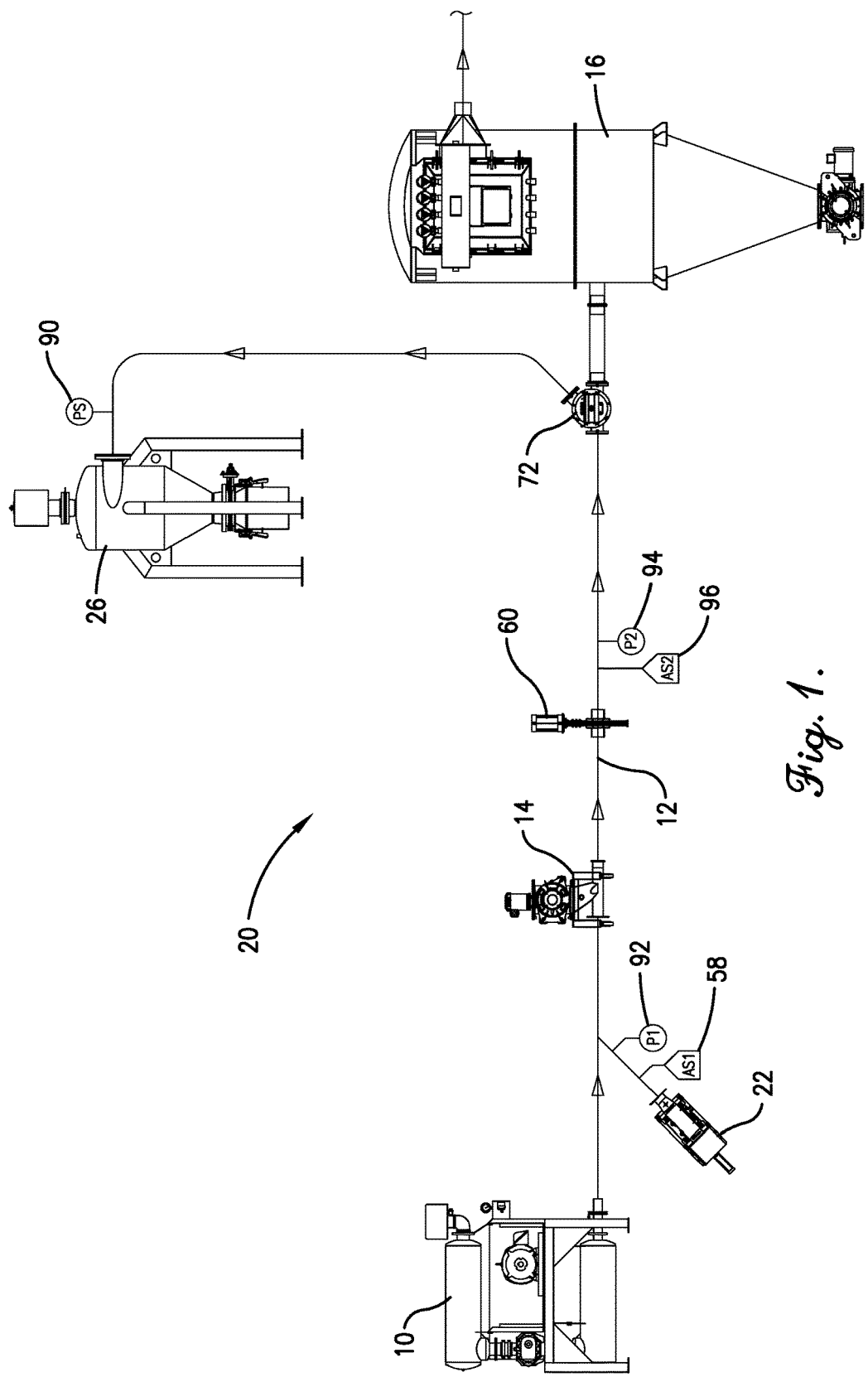
FIG. 1 illustrates a schematic view of a cleaning system for cleaning a pneumatic conveyance system according to embodiments of the present invention.

Embodiments of the present invention are directed to systems and methods for cleaning a pneumatic conveyance system. As illustrated in FIG. 1, the pneumatic conveyance system may comprise a pressure blower 10 positioned adjacent to an inlet of a convey line 12 and configured for providing pressurized air to the convey line 12, a material-introduction device 14 positioned downstream of the pressure blower 10 and configured for introducing particulate material into the convey line 12, and a receiver 16 positioned adjacent to an outlet of the convey line and configured for receiving the air and particulate material that travels through the convey line 12. As used herein, the term downstream is defined to mean a direction along the convey line 12 away from the pressure blower 10, while the term upstream is defined to mean a direction along the convey line 12 towards the pressure blower 10.

The pressure blower 10 may comprise any type of motive air source such as a blower, air pump, fan, or other device capable of creating a pressure differential and for forcing air or other fluid, under pressure, through the convey line 12. As such, the pressure blower 10 is configured to generate a positive air-pressure for purposes of introducing air into convey line 12 and for causing particulate material introduced into the convey line to travel through the convey line 12. In some embodiments, the pressure blower 10 may be configured to generate an air pressure within the convey line 12 of between 0.1 and 5 bar, between 0.3 and 3 bar, or between 1 and 2 bar above an ambient atmospheric pressure. In some embodiments, as will be described below, the pressure blower 10 may only be required to generate a pressure of 1 bar above ambient atmospheric pressure.

The convey line 12 may comprise any type of conduit, duct, pipe, or the like, which provides a fluid path through which air and particulate material can travel. The convey line 12 may be formed from various materials having sufficient strength and durability, such as aluminum, steel, galvanized steel, galvanized carbon steel, and the like. The convey line 12 may be provided in various sizes depending on the material being transported therein. In some embodiments, the convey line 12 may have an inner diameter of between 2 and 12 inches, between 4 and 10 inches, between 5 and 8 inches, or about 4 inches, or about 6 inches.

The material-introduction device 14 may comprise various devices configured to introduce particulate material into the convey line 12. In some embodiments, the material-introduction device 14 may be connected to the convey line 12 via a rotary airlock valve, which enables the introduction of particulate material into the convey line 12 without permitting air pressure to escape from the convey line 12. Finally, the receiver 16 may be any type of vessel configured to receive the air and particulate material as they exit from the convey line. In some embodiments, the air and the particulate material may be separated in the receiver 16 (e.g., via a filter), such that the particulate matter can be delivered to its final destination (e.g., bagging or packaging).

Given the pneumatic conveyance system described above, embodiments of the present invention are directed to a cleaning system 20, as also illustrated in FIG. 1, configured to clean such pneumatic conveyance system. With continued reference to FIG. 1, the cleaning system 20 may comprise a launcher 22 configured to introduce a cleaning pig 24 (See, e.g., FIG. 2) into the convey line 12 for purposes of cleaning the convey line 12 of residue from the particulate material, as well as other sediment, contamination, or other undesirable material. In addition, the cleaning system 20 may comprise a catcher 26 for receiving the pig 24 after the pig 24 has traveled through and cleaned the convey line 12. As will be described in more detail below, the functionality of the cleaning system 20 may, in some embodiments, be performed at least partly in an automated fashion so as to permit the cleaning of the convey line 12 to be performed with limited manual intervention.

Figure 2:
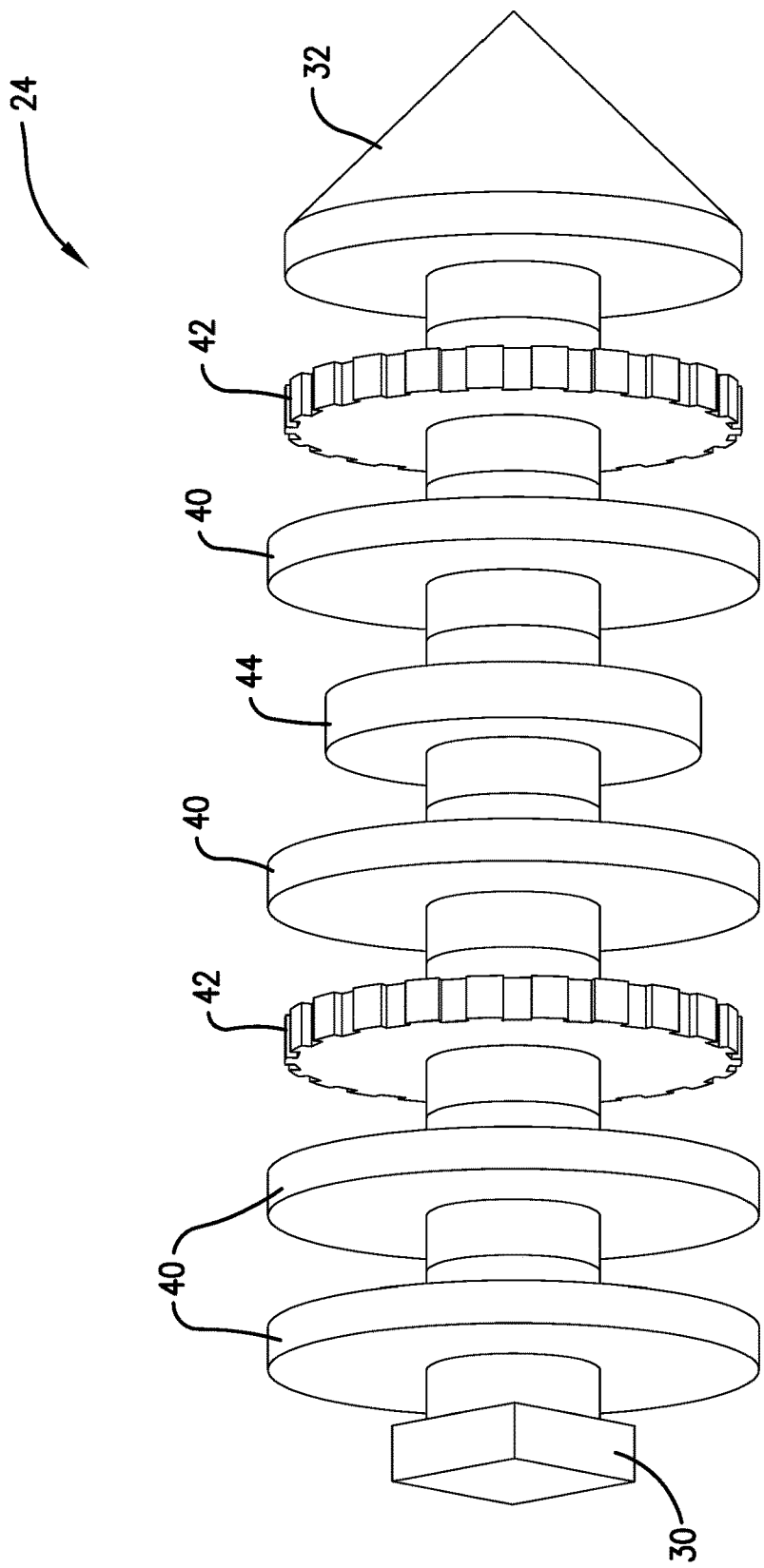
FIG. 2 is a perspective view of a pig according to embodiments of the present invention.

Beginning with the pig 24, as illustrated in FIGS. 2-3, the pig 24 may comprise a generally-elongated projectile that includes a base 30, a head 32, a rod 34 that extends between the base and the head 32, and a plurality of discs (discussed in more detail below) positioned on the rod 34 between the base 30 and the head 32. In more detail, and with reference to FIG. 3, the base 30 may comprise an end section with the elongated rod 34 extending from the base 30 to the head 32. The rod 34 may be integrally formed with the base 30 and may be secured to the head 32 by various methods of attachment, such as via a threaded engagement. In contrast, FIGS. 4-5 illustrate a pig 24 in which the rod 34 is integrally formed with the head 32 and is threadedly engageable with the base 30.

The base 30 and/or the rod 34 may be generally solid and formed from a hard rubber, polyurethane, or plastic (e.g., 65 A or 85 A Durometer) so as to be at least somewhat flexible, yet strong and durable. Similarly, the head 32 may be generally solid and formed from a hard rubber, polyurethane, or plastic (e.g., 85 A Durometer). The head 32 may be formed in a conical or a cylindro-spherical shape. Thus, as the pig 24 travels through the convey line 12, the shape of the head 32 is configured to direct or turn the pig 24 upon the pig 24 encountering turns, bends, joints, and/or connections in the convey line 12. In addition, the ability of the rod 34 to flex may enhance the maneuverability of the pig 24 through the convey line 12. The pig 24 may have a length specified for use in a particular pneumatic conveyance system. For example, as described in more detail below, the pig 24 may be required to have a length that is greater than the rotary-valve airlock of the material-introduction device 14. In some embodiments, the pig 24 may have a length of between 8 and 30 inches, between 10 and 20 inches, about 12 inches, or about 18.5 inches.

Returning to FIGS. 2-3, the plurality of discs may comprise one or more sealing discs 40, one or more cleaning discs 42, and one or more knuckle discs 44. The sealing discs 40 may be formed from hard rubber, polyurethane, or plastic (e.g., 65 A Durometer) and may have diameters that correspond with or that are generally equal to the interior diameter of the convey line 12, such that the sealing discs 40 can provide a fluid seal across the interior of the convey line 12 against the interior wall of the convey line 12. For example, in embodiments in which the interior diameter of the convey line 12 is about 6 inches, the sealing discs 40 may have a diameter of about 6 inches. However, in some embodiments, the sealing discs 40 may have a diameter that is at least nominally less than the interior diameter of the convey line, such as about 5.5 inches, about 5.75 inches, about 5.8125 inches, or about 5.875 inches. As such, when a positive air pressure is provided from behind the pig 24, the pressure can act to propel the pig 24 through the convey line 12. In some embodiments, the pig of the present invention may be configured to travel through the convey line 12 under a pressure of about 1 bar greater than an ambient atmospheric pressure. In some alternative embodiments, as illustrated in FIGS. 4-6, the plurality of discs may also include one or more motive discs 46. Such motive discs 46 may be cup shaped, with a concave portion of the cup shape being directed rearward (as shown in FIGS. 4-5) of the pig 24 when the motive disc 46 is integrated as part of the pig 24. In such a configuration, the motive discs 46 can function to more effectively receive the force imparted by the pressurized air so as to more efficiently propel the pig 24 through the convey line 12. The motive discs 46 may have a diameter that is at less than the interior diameter of the convey line, such as about 5.5 inches, about 5.75 inches, about 5.8125 inches, or about 5.875 inches. As with the sealing discs 40, the motive discs 46 may be formed from hard rubber, polyurethane, or plastic (e.g., 65 A Durometer).

The cleaning discs 42 may be formed from a high strength material, such as steel, carbon-fiber, composites, or the like, and may be formed with diameters that are generally equal to the interior diameter of the convey line 12. As such, the cleaning discs 42 may include cleaning surfaces that are configured to at least partially create an interference with the interior wall of the convey line 12 so as to generate a cleaning force capable of removing residue, sediment, contamination, or other undesirable material from the convey line 12. In some embodiments, as is shown in FIGS. 2-3, the cleaning discs 42 may include cleaning surfaces in the form of serrated edges located on the perimeters of the discs. As such, the cleaning discs 42 may be configured to cut through deposits of sediment and/or contamination that is caked on the interior walls of the convey line 12.

Finally, as shown in FIGS. 2-3, the knuckle discs 44 may be formed with a diameter that is substantially less than the interior diameter of the convey line 12. The knuckle discs may be formed with a medium-soft rubber, polyurethane, or plastic (e.g., 45 A Durometer). As such, when integrated with the pig 24, the knuckle discs 44 permit the pig 24 to bend around the knuckle discs, which acts as a bending point, when the pig 24 is passing through bends, turns joints, or connections in the convey line 12.

As discussed above, certain embodiments of the present invention provide for components of the pig 24 to be formed from flexible materials that permit the pig 24 to flex, but to maintain sufficient rigidity to clean the interior wall surfaces of the convey line 12. For example, in some embodiments, one or more components of the pig 24 may be formed from rubber, polyurethane, or plastic. However, as noted above, the cleaning discs 42 may be formed from material with sufficient hardness and durability to provide a cutting action. For instance, such materials may comprise steel, carbon-fiber, composites, or the like.

As illustrated in FIGS. 2-5, certain of the components of the pig 24 may be modular. For example, the number, type, and order of the discs included in any particular pig 24 can be customized as necessary to obtain required cleaning forces and/or propulsive forces. In particular, as illustrated in FIGS. 3 and 5, each of the discs may be formed with an opening extending through its center, such that the discs can be positioned over the rod 34, between the base 30 and the head 32. Upon positioning the discs on the rod 34, the rod 34 can be threaded to the base 30 and/or the head 32 to secure the components of the pig 24 in place. (In some embodiments, the base 30 and/or the head 32 may include one or more discus, e.g., sealing disc 40, integrally formed thereto). As such, the modular design of the pig 24 permits the number, type, and order of the discs used on any given pig 24 can be customized to fit a particular requirement. However, in some embodiments, it may be required that the pig 24 have at least a minimum length, with such minimum length determined by a length of the connection/transition between the material-introduction device 14 and the convey line 12 (e.g., the rotary-valve airlock including any blow through adapter). Specifically, in some embodiments, the minimum length of the pig 24 may need to be at least nominally greater than the length of the connection/transition between the material-introduction device 14 and the convey line 12 (e.g., the rotary-valve airlock including any blow through adapter). Such a minimum length may ensure that the pig 24 can travel through the convey line 12 and past the rotary-valve airlock without the convey line 12 losing pressure, which can bring movement of the pig 24 to a halt and can, thus, interfere with or stop the cleaning process. In some embodiments, the distance between a forward-most sealing disc 40 and a rearward-most sealing disc 40 of the pig 24 may need to be at least nominally greater than the length of the connection/transition between the material-introduction device 14 and the convey line 12 (e.g., the rotary-valve airlock including any blow through adapter), so as to ensure that the convey line 12 does not lose pressure as the pig 24 passes by the rotary-valve airlock.

Turning to the launcher 22 in more detail, as shown in FIG. 1, the launcher 22 can be directly connected to the convey line 12, such as via a Y-connection or the like. In some embodiments, the launcher 22 will be connected to a "clean side" of the convey line 12, with the clean side defined to mean a portion of the convey line 12 that is upstream (i.e., in a direction towards the pressure blower 10) from the rotary-valve airlock of the material-introduction device 14 where particulate material is added to the convey line 12.

Figure 7:
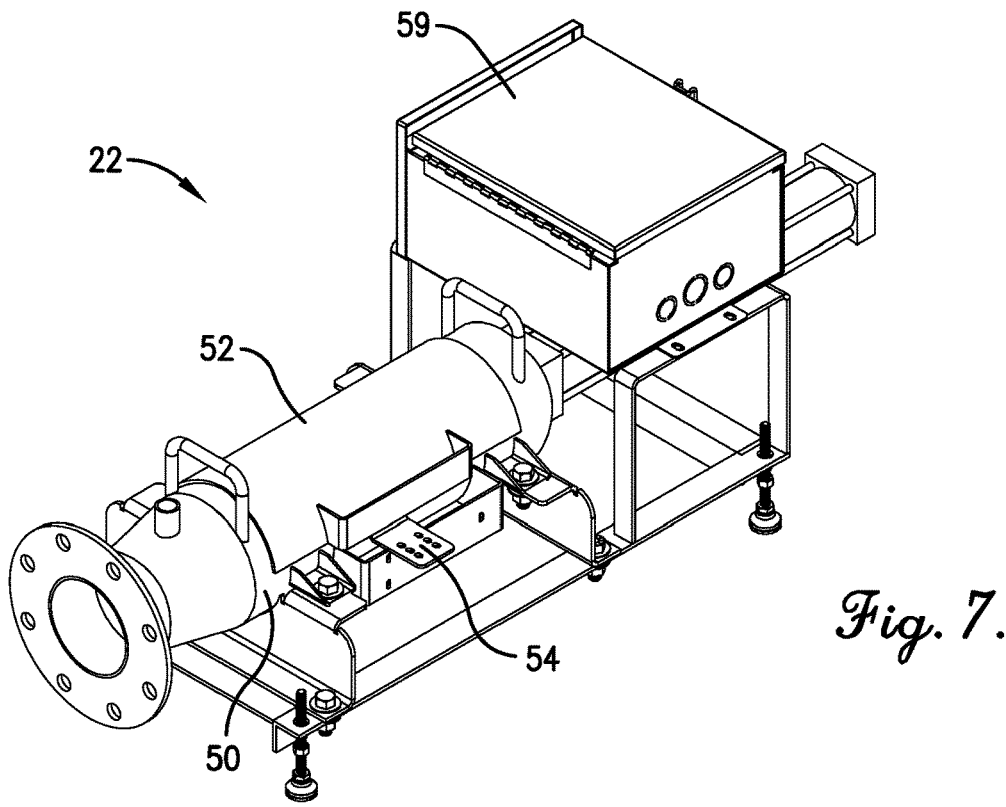
FIG. 7 is a perspective view of a launcher according to embodiments of the present invention, particularly illustrating the launcher having an access door in a closed position.
Figure 8:
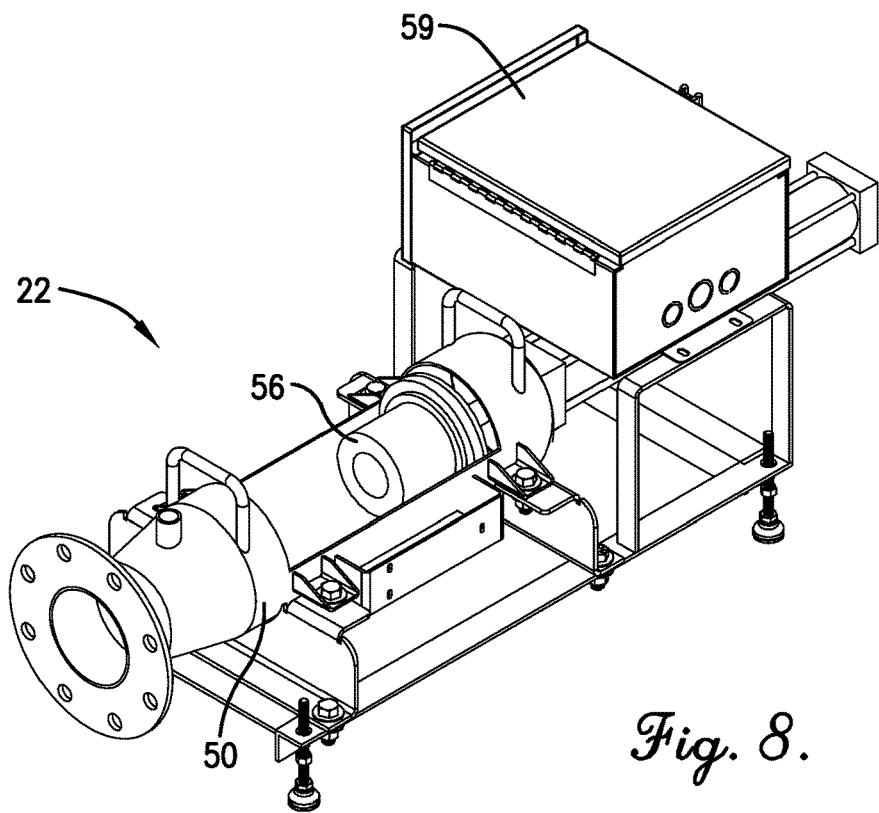
FIG. 8 is a perspective view of the launcher from FIG. 7, with the access door removed to illustrate a cylinder for launching a pig into a convey line.
Figure 9:
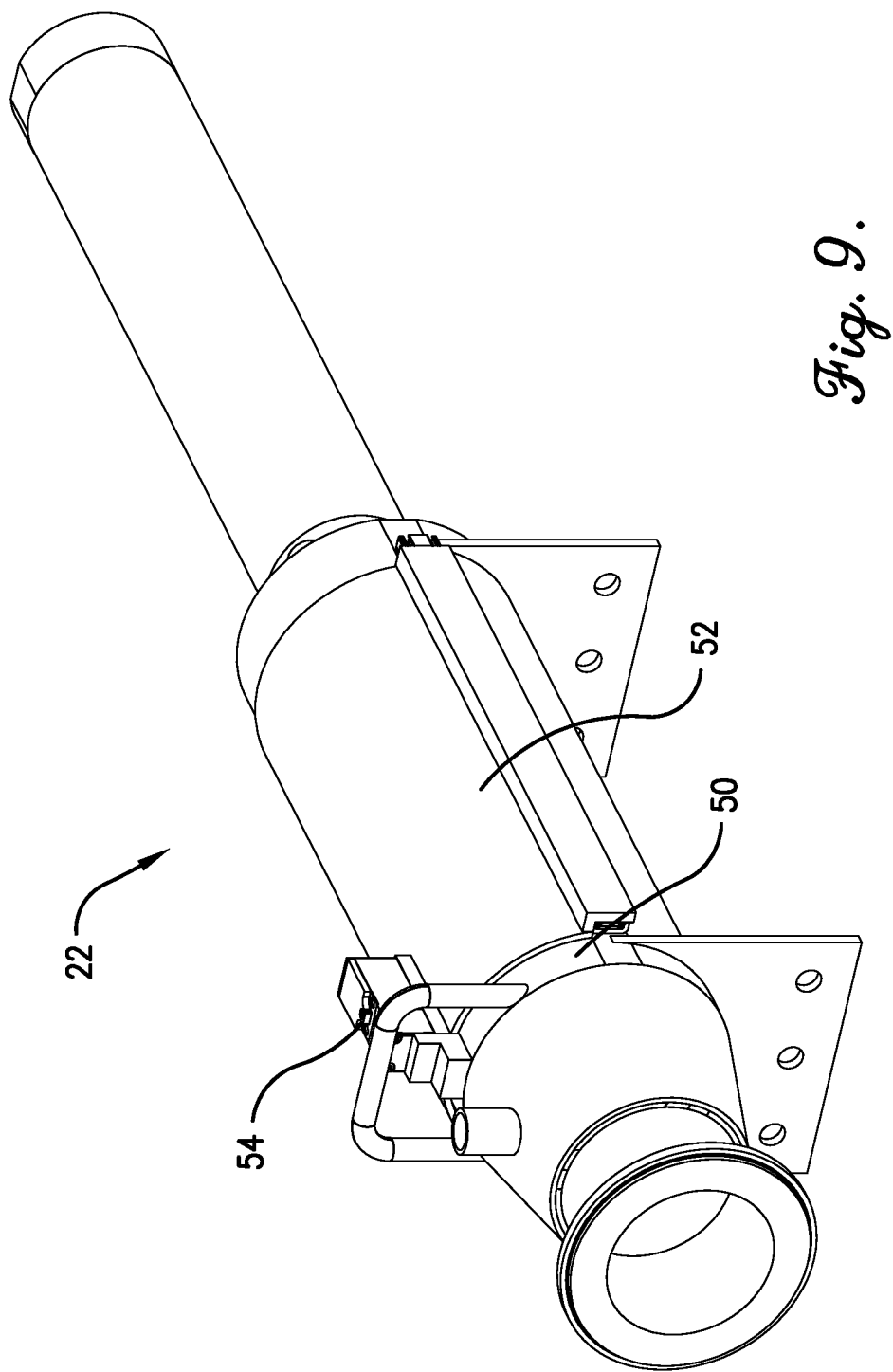
FIG. 9 is a perspective view of another launcher according to embodiments of the present invention, particularly illustrating the launcher having a sliding access door in a closed position.
Figure 10:
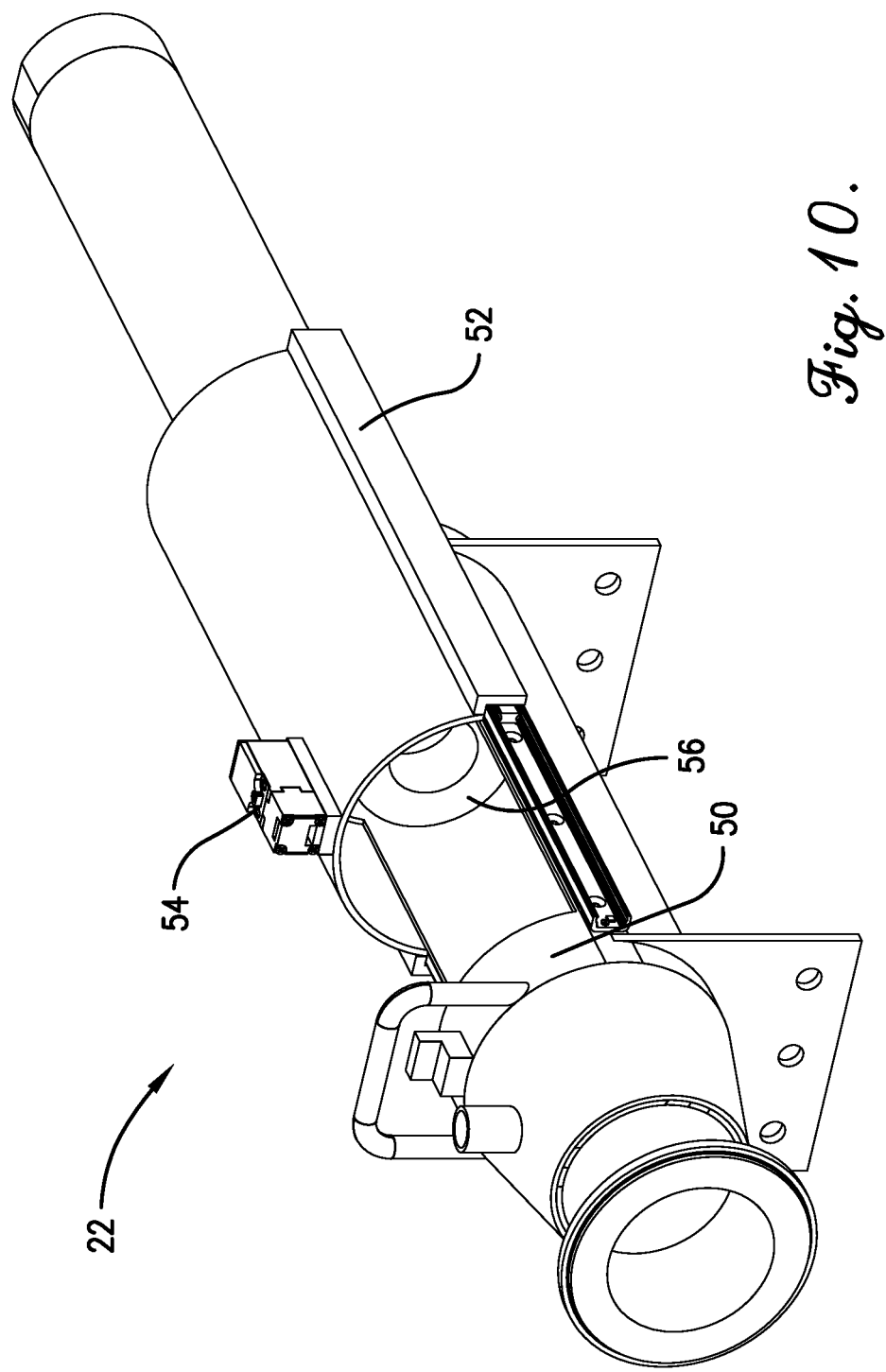
FIG. 10 is a perspective view of the launcher from FIG. 9, with the access door in an open position to illustrate a cylinder for launching a pig into a convey line.

With reference to FIGS. 7-8, the launcher 22 may comprise a launching tube 50, which is configured to receive a pig 24 for injection into the convey line 12. The launching tube 50 may include an access door 52 through which the pig 24 can be placed within the launching tube 50. The access door 52 may be hingedly connected to the launching tube 50 so as to rotate open, as shown in the embodiments of FIGS. 7-8. Contrastingly, in some embodiments, the access door 52 may be slidingly connected to the launching tube 50 such that the access door 52 is configured to slidingly open (e.g., via a sliding track system), as is shown in FIGS. 9-10. Regardless, once the pig 24 is placed inside the launching tube 50, the access door 52 may be closed and locked in place via a locking safety latch 54, which prevents the access door 52 from being inadvertently opened during operation of the cleaning system 20.

As perhaps best shown in FIGS. 8 and 10, the launcher 22 may include a pneumatic or mechanically-operated cylinder 56 for pushing the pig 24 out from the launching tube 50 and into the convey line 23. Furthermore, as illustrated in FIG. 1, the launcher 22 may be associated with a first pigging air source 58, such as an air pump, blower, a fan, or compressed air source (e.g., tank of pressurized air), for propelling the pig 24 into the convey line 12 and through a portion of the convey line 12. In some embodiments, the first pigging air source 58 may be configured to generate an air pressure within the convey line 12 of between 0.1 and 5 bar, between 0.3 and 3 bar, or between 1 and 2 bar above an ambient atmospheric pressure. In some embodiments, the first pigging air source 58 may only be required to generate a pressure of about 1 bar above ambient atmospheric pressure for purposes of propelling the pig 24 through the convey line.

The cleaning system 20 may include a control system for controlling operation of the launcher 22. In some embodiments, the control system may include pneumatic, mechanical, or electrical control components, or combinations thereof. Certain of such components may be located within a junction box 59 associated with the launcher 22, as is illustrated in FIGS. 7-8. The control system is configured to control operation of the launcher 22 and, thus, the insertion of the pig 24 into the convey line 12. The control system may also be configured to control other components of the cleaning system 20 (and/or the pneumatic convey system), as discussed in more detail below.

In some additional embodiments, the cleaning system 20 may include an isolation valve 60 incorporated with the convey line 12 at a position between the rotary-valve airlock of the material-introduction device 14 and the catcher 26, as is illustrated in FIG. 1. The isolation valve 60 may comprise an on/off-type shut-off valve configured to fluidly separate the portions of the convey line 12 on either side of the isolation valve 60. For example, with the isolation valve 60 in the closed position, the isolation valve 60 may isolate the components of the cleaning system 20 and/or the pneumatic conveyance system that are upstream of the isolation valve 60 (e.g., pressure blower 10, launcher 22, and material-introduction device 14) from those components that are downstream of the isolation valve 60 (e.g., the receiver 16 and/or catcher 26). As such, and as will be described in more detail below, the isolation valve 60 permits independent use of the cleaning system 20, both upstream and downstream of the isolation valve 60.

Figure 11:
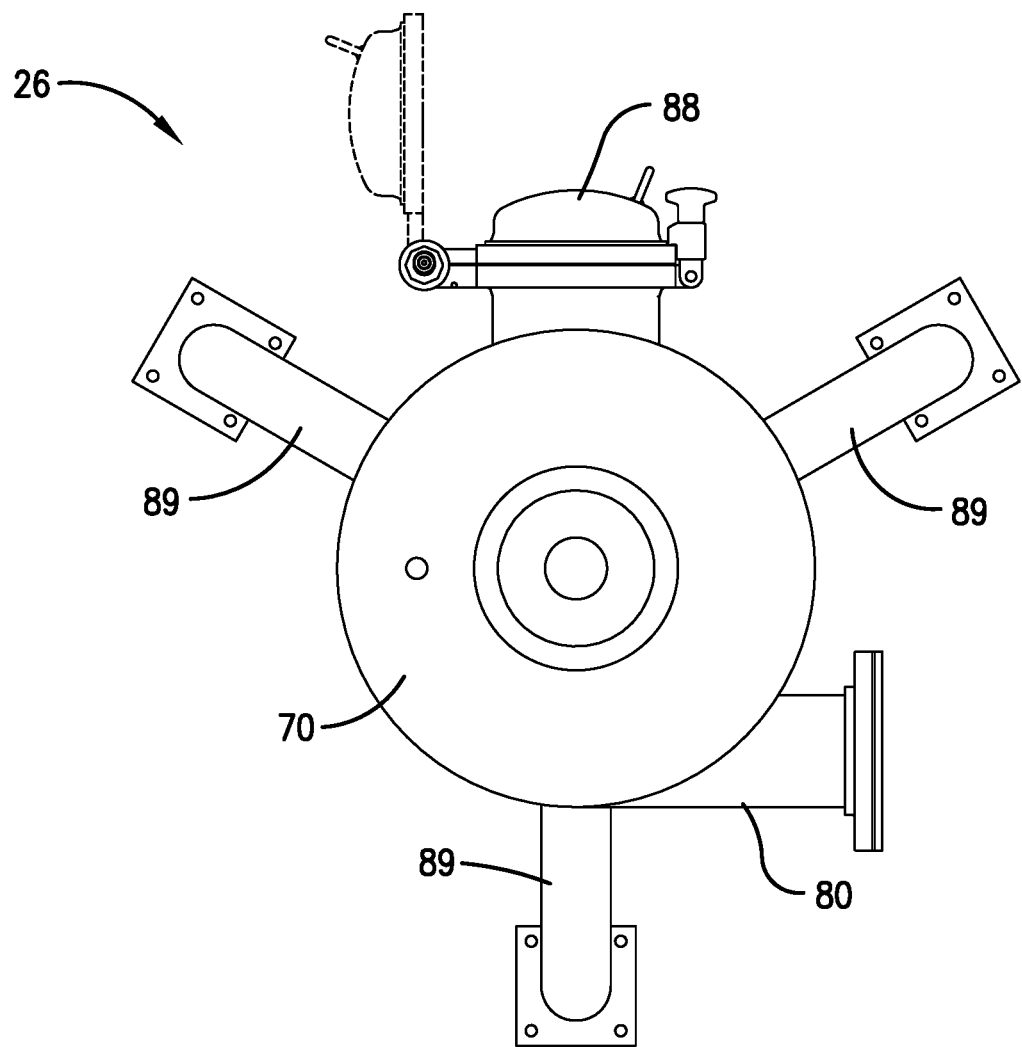
FIG. 11 is a top plan view of a catcher according to embodiments of the present invention.
Figure 12:
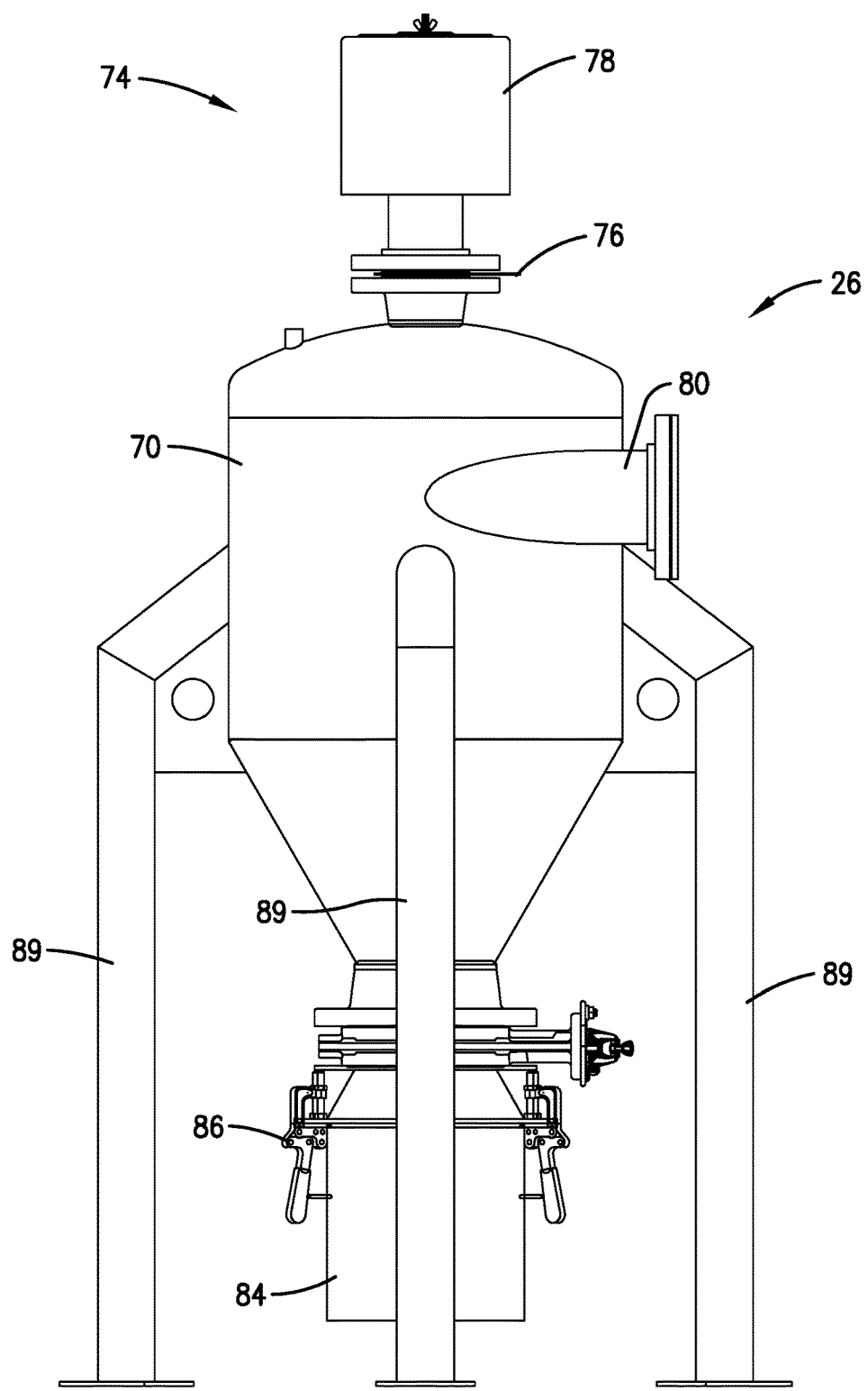
FIG. 12 is a side elevation view of the catcher from FIG. 11.
Figure 13:
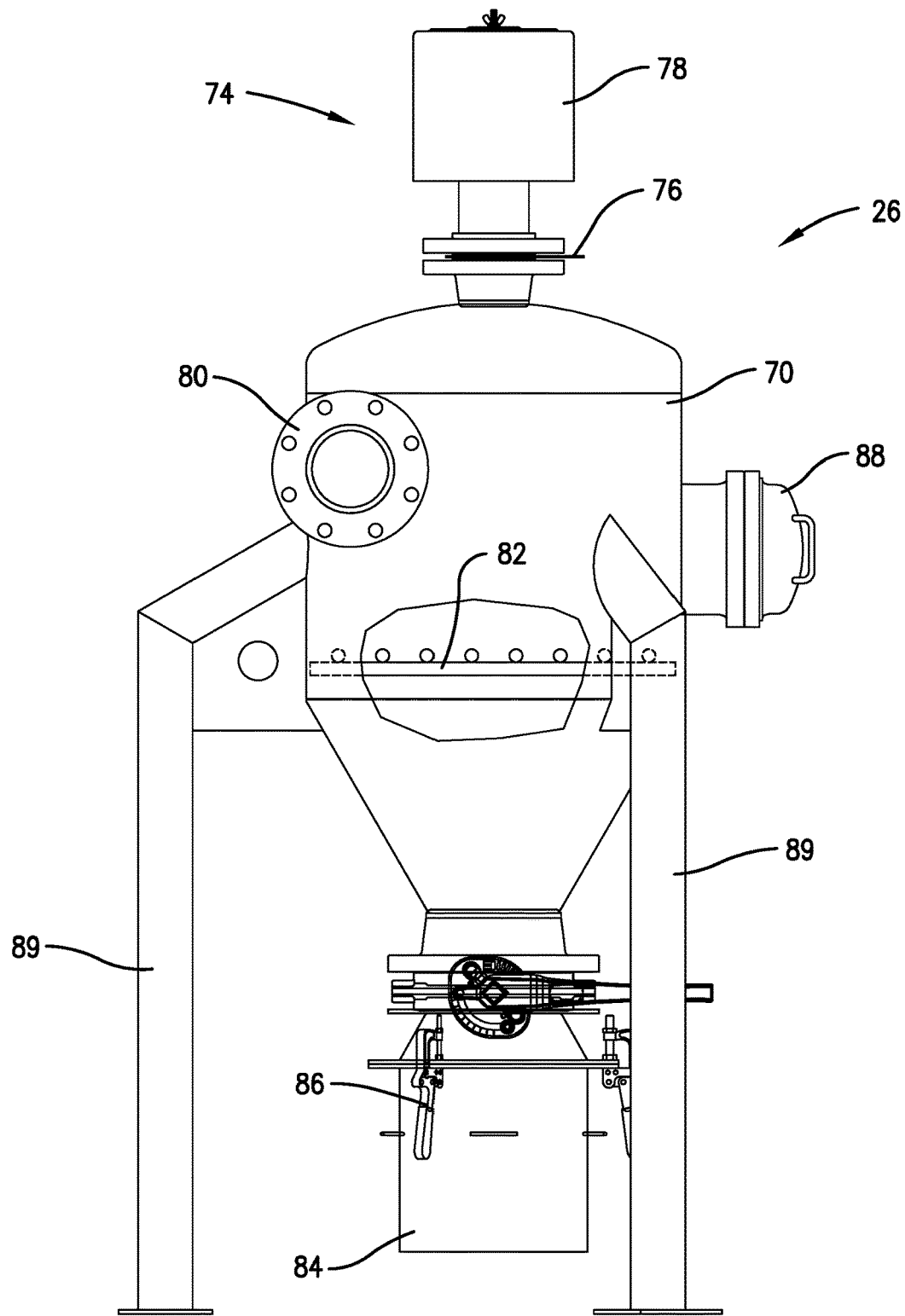
FIG. 13 is a front elevation view of the catcher from FIGS. 11-12.

Turning to the catcher 26 in more detail, as shown in FIG. 11-13, the catcher 26 may be formed as a rigid vessel 70 configured to receive the pig 24 after the pig 24 has passed through the convey line 12 during the pig's 24 cleaning of the convey line 12. In particular, as illustrated in FIG. 1, the catcher 26 can be connected to the convey line 12, towards the end of the convey line 12, adjacent to the receiver 16. In some embodiments, as shown in FIG. 1, the cleaning system 20 may include a diverter valve 72 positioned toward the end of the convey line 12, just upstream of the receiver 16. The diverter valve 72 can be selected from any type of valve capable of selectively fluidly connecting the convey line 12 with the receiver 16 or with the catcher 26. Specifically, the diverter valve 72 may configured to selectively direct air flow and/or the pig 24 into the receiver 16 or into the catcher 26. In some embodiments, the pneumatic conveyance system may include a section of convey line 12 between the diverter valve 72 and the catcher 26. However, in other embodiments, the catcher 26 may be integrated with the diverter valve 72, such that the catcher 26 is directly connected with the main convey line 12 via the diverter valve 72.

Returning to FIGS. 11-13, the vessel 70 of the catcher 26 may be formed as a rigidly, cylindrical vessel, configured to receive the pig 24 as the pig 24 exits the convey line 24. The vessel 70 may be formed in various sizes, but may, in some embodiments, have a diameter of between 1 and 6 feet, between 1.5 and 4 feet, or about 2 feet. The vessel 70 may be formed from stainless steel or other material with sufficient strength and durability to catch pigs 24 as the pigs 24 exit the convey line 12. It should be understood that the pigs 24 will generally be travelling at high velocity when the pigs 24 exit the convey line 12 due to the force of the air pressure propelling the pigs 24 through the convey line 12. In addition to withstanding the force of the pigs 24, the catcher 26 should be configured to withstand the high air pressures and high air volumes present behind the pigs 24 as the pigs 24 are forced through the convey line 12 and into the catcher 26.

To accommodate such high air pressures/volumes, certain embodiments of the present invention include features that allow the catcher 26 to dissipate such air pressures/volumes from within the catcher 26 in a regulated manner. Specifically, as perhaps best illustrated in FIGS. 12-13, the catcher 26 may include an exhaust system 74 for releasing pressurized air from within the catcher 26 in a controlled and filtered manner. The exhaust system 74 may include a restrictor element 76 for regulating the air flow/pressure released from the vessel 70 and a filter 78 for filtering particulates from the released air. In more detail, given the potentially high air pressure/volume involved, it may be problematic (or dangerous) to release all of the pressurized air at once from within the catcher 26. As such, certain embodiments provide for the exhaust system 74 to include restrictor element 76, which is configured to regulate or restrict the air flow and/or pressure released from the catcher 26 via the exhaust system 74. In some embodiments, the restrictor element 76 may be configured as an orifice plate and/or a restrictor plate. As such, the restrictor element 76 is configured to keep the air volume exhausted from the vessel 70 from overwhelming the exhaust filter 78 in a safe, controlled manner. The restrictor element 76 also provides the ability to size the exhaust filter 78 appropriately for the cleaning operations.

In addition to acting as a safety feature, the exhaust system 74 may be operable to decelerate the pigs 24 as the pigs 24 travel through an end portion of the convey line 12 and into the catcher 26. Specifically, as a pig 24 travels through the convey line 12, a certain amount of air volume will exist in front of the pig 24 and will be pushed by the pig 24 into the catcher 26. Because the restrictor element 76 is configured to restrict the amount of air that is released from the catcher 26, at least a portion of the air volume in front of a pig 24 will be retained in the catcher 26 (and perhaps in an end portion of the convey line 12 adjacent to the catcher 26), such that the portion of air volume retained within the catcher 26 will act as a source of friction to slow the pig 24 as the pig 24 enters the catcher 26. The ability to decelerate the pig 24 as it exits into the catcher 26 is beneficial because the pig 24 may be travelling at very high speeds (due to the high air pressure used to propel the pig 24 through the convey line 12), and unless the pig 24 is at least partially decelerated, the impact of the pig 24 into the catcher 24 at such high speeds could damage the catcher 26 and/or the pig 24.

To further assist in safely decelerating the pig 24, as perhaps best illustrated in FIG. 11, an inlet 80 to the catcher 26 (with such inlet 80 being connected to the end of the convey line 12, as illustrated in FIG. 1) may be oriented generally tangentially with respect to an interior wall surface of the vessel 70. Given that the vessel 70 may be generally shaped as a cylinder, when the pig 24 enters the vessel 70 through the tangentially-positioned inlet 80, the pig 24 will make contact with and travel around the interior circularly-shaped wall surface of the vessel 70, which will function to reduce the momentum of the pig. Specifically, the pig 24 will travel around the interior wall surface of the vessel 70 until the pig 24 loses enough momentum that the pig 24 will fall down and comes to rest on an internal grate 82 (as illustrated in FIG. 13). The internal grate 82 may span across an interior of the vessel 70 and may be formed as a metal cross-hatched grate and/or metal rods that are welded in place to the interior wall surface of the vessel 70. Any residue, sediment, contamination, or other material cleaned from the convey line 12 by the pig 24 and brought into the catcher 26 by the pig 24 will fall down under the force of gravity through the internal grate 82 and into a collection container 84, such as the drum shown in FIGS. 12-13. A valve 86, such as a butterfly valve or other similar mechanism, may provide access to the collection container 84 for cleaning purposes. For instance, releasing the valve 86 permits a user to remove the collection container 84 to dispose of any residue, sediment, contamination, or other material retained in the collection container 84. Additionally, as shown in FIGS. 11 and 13, an access door 88 provides access to an interior of the vessel 70 adjacent to the internal grate 82 such that a user can retrieve pigs 24 that are received within the catcher 26. The catcher 26 may be positioned at a requisite height, such as to align the inlet 80 with the convey line 12 and to provide sufficient room for the collection container 84, via one or more support legs 89. In the embodiments shown in the drawings, for instance, the catcher 26 may have three support legs 89 positioned around the vessel 70 in 120 degree separation. As such, the catcher 26 may stand between 4 and 12 feet, between 6 and 10 feet, or about 7 feet above the ground surface.

In addition to the cylindrically-shaped vessel 70 described above, certain embodiments provide for the catcher 26 to be formed in other shapes. For example, some embodiments may provide for the vessel 70 to be rectangular or square shaped. In such embodiments, the vessel 40 may have a width that is at least nominally larger than the length of the pig 24, such that the entire length of the pig 24 can fit within the vessel 70 after entering the vessel 70 from the inlet 80. In such a configuration, after the pig 24 enters the vessel 70, the momentum of the pig 24 will be stopped by one of the side walls of the vessel 70, and the pig 24 will fall down and rest on the internal grate 82.

Finally, in some additional embodiments, the catcher may be associated with a pig sensor 90, as illustrated in FIG. 1, which is configured to provide an indication of when a pig 24 has been received in the catcher 26. The pig sensor 90 may be configured as a position sensor (e.g., laser sensor, electrical or magnetic sensor (e.g., a hall-effect sensor), pressure sensor, or the like), and may be positioned on the catcher 26 or on an end portion of the convey line 12 adjacent to the catcher 26. For example, the pig sensor 90 may be associated with the inlet 80 of the catcher 26. In embodiments in which the pig sensor 90 is in the form of a laser sensor, laser sensor may emit a laser light beam across the interior space of the inlet 80, such that as a pig 24 crosses the laser light beam, the pig sensor 90 can detect that a pig has been received within the catcher 26. For the pig sensor 90 in the form of a magnetic sensor, the pig 24 may be formed, at least partially, with a magnetic material (e.g., iron), such that as a pig 24 passes by the pig sensor 90, the pig sensor 90 can detect the pig 24 and determine that the pig 24 has been received within the catcher 26. For the pig sensor 90 in the form of a pressure sensor, the pig sensor 90 may be configured to measure the pressure at the inlet 80 of the catcher 26, such that as a pig 24 passes by the pig sensor 90, the pig sensor 90 can detect the associated pressure change and determine that the pig 24 has been received within the catcher 26. Regardless of the type of sensor used, as pigs 24 enter the catcher 26, the pig sensor 90 can sense the receipt of the pig 24 by the catcher 26 and transmit (wired or wirelessly) an indication of such receipt to the control system, such that the control system can identify when the pigs 24 that are launched by the launcher 22 have traveled through the convey line 12 and have been received by the catcher 26.

With reference to FIG. 1, a method of cleaning a convey line 12 of a pneumatic convey system will now be described in more detail. Initially, the pneumatic convey system will be operating in its normal "operational configuration," with the pressure blower 10 introducing pressurized air through an inlet of the convey line 12 and particulate material being introduced into the convey line 12 via the material-introduction device 14. As such, the particulate material will be conveyed, via the pressurized air provided by the pressure blower 10, through the convey line 12 into the receiver 16. In such an operational configuration of the pneumatic convey system, the components of the cleaning system 20 will not generally be activated. For example, the first pigging air source 58 at the launcher 22 may not be activated, the cylinder 56 in the launcher 22 will be extended in a closed position, and the diverter valve 72 is configured to direct pressurized air and particulate material to the receiver 16. Furthermore, in embodiments that include the isolation valve 60 between the rotary-valve airlock of the material-introduction device 14 and the diverter valve 72, the isolation valve 60 will be in an open position so as to permit pressurized air and particulate material to pass through the isolation valve 60 and into the receiver 16.

Remaining with FIG. 1, in some embodiments, the cleaning system 20 may include a first pressure sensor/transmitter 92 located adjacent to the launcher 22, as well as a second pressure sensor/transmitter 94 located adjacent to and downstream of the isolation valve 60. The first and second pressure sensor/transmitters 92, 94 are configured to measure a pressure within the convey line 12 and to transmit (wired or wirelessly) such sensed pressures to the control system of the cleaning system 20. As such, with the pneumatic conveyance system in an operational configuration, each of the first and second pressure sensor/transmitters 92, 94 will sense a convey pressure, which is generally equivalent to the air pressure generated by the pressure blower 10 to transport particulate material to the receiver 16.

To transition from a normal operational configuration to a cleaning configuration, the pressure blower 10 and the material-introduction device 14 will be turned off, such that the convey line 12 is depressurized and particulate material is no longer introduced into the convey line 12. As such, each of the first and second pressure sensor/transmitters 92, 94 will read will read zero pressure (with respect to ambient atmospheric pressure). Next, the diverter valve 72 may be transitioned from fluidly connecting the receiver 16 to fluidly connecting the catcher 26. As such, anything traveling through the convey line 12 (e.g., pressurized air, particulate matter, and/or the pig 24) will be directed to the catcher 26 as opposed to the receiver 16. Next, the launch cylinder 56 of the launcher 22 may be retracted to an open position, and the access door 52 ay be opened. As such, a pig 24 can be placed in the launching tube 50.

Upon the pig 24 being placed in the launcher 22, a launching sequence can commence so as to inject the pig 24 into the convey line 12. Such a launch sequence can be initiated by a user initiating a control element (e.g., button, switch, or the like) on the junction box 59 associated with the launcher 22. Upon initiating the launch sequence, the control system of the cleaning system 20 can perform one or more of the following operations in an automated fashion. First, the launcher access door 52 may be closed and locked via the safety latch 54. Next, the launcher cylinder 56 may be extended from an open position to a closed position, thereby forcing the pig 24 out of the launching tube 50 and into the convey line 12. Next, the first pigging air source 58 associated with the launcher 22 may be activated so as to begin to propel the pig 24 through the convey line 12, past the rotary-valve airlock of the material-introduction device 14 and past the isolation valve 60. However, in some embodiments, the first pigging air source 58 may not be required, and the pig 24 may be propelled through the convey line 12 by an airflow generated by the pressure blower 10.

Regardless, once the pig 24 has passed the isolation valve 60 and the second pressure sensor/transmitter 94, the each of the first and second pressure sensor/transmitters 92, 94 will read a positive pressure as a result of the positive air pressure behind the pig 24, which is generated by the first pigging air source 58. In some embodiments, upon the pig 24 passing the isolation valve 60 (e.g., as indicated by the second pressure sensor/transmitter 94 sensing the change in pressure from zero to a positive pressure), the control system may instruct the isolation valve 60 to close behind the pig 24, and may further instruct the pigging air source 58 at the launcher 22 to be deactivated, such that the first pressure sensor/transmitter 92 at the launcher 22 will read zero pressure. Closing the isolation valve 60 may be beneficial so as to minimize the amount of pressurized air lost through the extent of the convey line 12, such as through the rotary-valve airlock of the material-introduction device 14.

Next, a second pigging air source 96 downstream of the isolation valve 60 can be activated so as to propel the pig 24 through the remaining portion of the convey line 16 and into the catcher 26. As with the first pigging air source 58, the second pigging air source 96 may comprise an air pump, blower, a fan, or compressed air source (e.g., tank of pressurized air), for propelling the pig 24 through the convey line 12. However, in certain embodiments, a common air source (e.g., air pump, blower, a fan, or the like) may supply each of the first and second pigging air sources 58, 96 via pneumatic conduits, lines, hoses, or the like. In some embodiments, the second pigging air source 96 may be configured to generate an air pressure within the convey line 12 of between 0.1 and 5 bar, between 0.3 and 3 bar, or between 1 and 2 bar above an ambient atmospheric pressure. In some embodiments, the first pigging air source 58 may only be required to generate a pressure of about 1 bar above ambient atmospheric pressure. As such, the pig 24 will travel through the convey line 12, past the diverter valve 72, and into the catcher 26.

It is understood that as the pig 24 is travelling through the convey line 12, it is cleaning deposits of residue, sediment, and/or contamination present in the convey line 12 (e.g., caked on the interior walls of the convey line). For example, the cleaning discs 42 on the pig 24 can perform cutting actions on residue caked on the interior wall of the convey line 12, so as to break up the residue and remove it from the interior wall. Thereafter, the pig 24 and the pressurized air will cause the residue to be propelled, along with the pig 24, to the catcher 26. As previously described, once the pig 24 enters the catcher 26, the pig 24 will land on the internal grate 82 of the catcher 26, while any deposits of residue, sediment, and/or contamination will fall through the internal grate 82 down into the collection container 84. The pig sensor 90 associated within the catcher 26 may provide an indication when the pig 24 has been received in the catcher 26. Alternatively, a loss of pressure within the convey line 12 as sensed by the first and/or second pressure sensor/transmitters 92, 94 may indicate that a pig 24 has been ejected from the convey line 12 and into the catcher 26. At such time, the second air source 96 downstream of the isolation valve 60 can be deactivated. Thereafter, the pig 24 can be removed from the catcher 26, via the access door 88, and the collection container 84 can be removed by opening the valve 86, such that the residue, sediment, and/or contamination from within the collection container 84 can be disposed.

Upon retrieving the pig 24 from the catcher 26, the access door 88 and the valve 86 can each be closed, such that the cleaning process can be repeated by sending another pig 24 through the convey line 12. In additional embodiments, a second pig 24 can be loaded into the launcher 22 and launched into the convey line 12 as soon as the first pig 24 has passed the isolation valve 60 and the isolation valve 60 is closed. As such, multiple pigs 24 can be sent through the convey line 12 at the same time. In some embodiments, the catcher 26 may be configured to hold multiple pigs 24 (e.g., 3 pigs or more), such that the catcher 26 does not have to be emptied until after all of the launched pigs 24 have been sent through the convey line 12 and received in the catcher 26.

Once the cleaning process has been completed, the pneumatic conveyance system can return to its normal operational configuration by configuring the diverter valve 72 to direct pressurized air and particulate matter to the receiver 16. In addition, the isolation valve 60 may be opened, and the pressure blower 10 and the material-introduction device 14 are reactivated, so as to again convey particulate matter introduced, via the material-introduction device 14, down the convey line 12 and into the receiver 16.

Beneficially, embodiments of the present invention provide for the cleaning process, as described above, to be performed in an automated fashion, requiring minimal manual intervention. Specifically, with the components of the cleaning system 20 (e.g., launcher 22, catcher 26, isolation valve 60, diverter valve 72) integrated with the convey line 12, the cleaning process can be performed without requiring significant down time of the normal pneumatic conveyance system operation, such as to break down the pneumatic convey system and to attach/detach components of the cleaning system 20. Additionally, the entire cleaning process can be controlled automatically by the control system of the cleaning system 20, which can control activation and deactivation of each of the components of the cleaning system 20 and/or the pneumatic conveyance system. For example, the control system may be configured to control the functions of the launcher 22 (including the access door 52, the safety latch 54, cylinder 56, and first pigging air source 58), the isolation valve 60 (including the second pigging air source 96), the diverter valve 72, etc. Furthermore, the control system may also be configured to control the pressure blower 10 and the material-introduction device 14. In some embodiments, the control system may include various automated inputs, such as inputs from the first and second pressure sensor/transmitters 92, 94, the pig sensor 90, etc. Thus, the control system can automatically convert the pneumatic conveyance system from an operational configuration to a cleaning configuration. Furthermore, once a pig 24 is introduced into the launcher 22, the control system may be configured to automatically control the movement of the pig 24 through the convey line 12 and into the catcher 26. Furthermore, the control system can determined when the pig 24 has completed its journey through the convey line 12 and has been received in the catcher 26. Upon completion of the cleaning process, the pneumatic conveyance system may be transitioned back from the cleaning configuration to the operational configuration. Thus, human intervention can be minimized, until it is time to remove the pig 24 from the catcher 26 and to dispose of the residue, sediment, and other contaminants form the catcher 26. Such automation increases the safety aspects of the cleaning process, as directing a projectile in an uncontrolled manner under high pressure through a standard pneumatic convey system can pose serious safety concerns.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

We claim:

1. A cleaning system for cleaning a pneumatic conveyance system used to transport particulate material, wherein the pneumatic conveyance system includes a material-introduction device for introducing particulate material into a convey line, and a motive air source for generating an air flow to propel the particulate material through the convey line, wherein the cleaning system comprises:
 a projectile comprising a cleaning surface for cleaning an interior of the convey line as the projectile travels through the convey line;
 a launcher for injecting said projectile into the convey line, wherein said launcher is coupled with the convey line at a position upstream from the material-introduction device; and
 a catcher vessel for receiving said projectile upon said projectile exiting the convey line.

2. The cleaning system of claim 1, further comprising an isolation valve positioned downstream of the material-introduction device for fluidly isolating portions of the convey line upstream and downstream of said isolation valve.

3. The cleaning system of claim 1, wherein the pneumatic conveyance system further includes a receiver for receiving particulate material from the convey line, wherein said cleaning system further comprising a diverter valve for selectively fluidly connecting the convey line to either the receiver or to said catcher vessel.

4. The cleaning system of claim 1, wherein said projectile is at least partially flexible.

5. The cleaning system of claim 1, wherein said projectile is modular and comprises a base, a head, and a plurality of discs positioned between said base and said head.

6. The cleaning system of claim 5, wherein said head is conical shaped.

7. The cleaning system of claim 5, wherein one or more of said plurality of discs comprises a sealing disc, wherein said sealing disc includes a diameter generally equal with an interior diameter of the convey line so as to provide a fluid seal across the convey line when said projectile is received in the convey line.

8. The cleaning system of claim 5, wherein one or more of said plurality of discs comprises a cleaning disc, wherein said cleaning disc includes the cleaning surface for cleaning the interior of the convey line as the projectile travels through the convey line.

9. The cleaning system of claim 5, wherein one or more of said plurality of discs comprises a motive disc, wherein said motive disc is cup shaped.

10. The cleaning system of claim 1, wherein said launcher comprises a launching tube for receiving said projectile.

11. The cleaning system of claim 10, wherein said launcher comprises an actuating cylinder for ejecting said projectile from said launching tube and injecting said projectile into the convey line.

12. The cleaning system of claim 1, wherein said catcher vessel is generally cylindrical shaped, and wherein an inlet of said catcher vessel is oriented generally tangentially with an interior wall of said catcher vessel.

13. The cleaning system of claim 1, wherein said catcher vessel includes an interior grating for supporting said projectile and for permitting particulate material to pass through to a collection container.

14. The cleaning system of claim 1, wherein said catcher vessel includes an exhaust system for regulating and filtering air being exhausted from said catcher vessel.

15. The cleaning system of claim 14, wherein said exhaust system comprises an orifice plate for regulating air flow being exhausted from said catcher vessel.

16. A method for cleaning a pneumatic conveyance system used to transport particulate material, wherein the pneumatic conveyance system includes a material-introduction device for introducing particulate material into a convey line, and a motive air source for generating an air flow to propel the particulate material through the convey line and to a receiver, wherein the method comprises the steps of:
 (a) injecting a projectile into the convey line, wherein the projectile comprises a cleaning surface for cleaning an interior of the convey line as the projectile travels through the convey line, wherein the projectile is injected via a launcher that is coupled with the convey line at a position upstream from the material-introduction device;

(b) propelling the projectile through the convey line;

(c) diverting the projectile from being directed towards the receiver to being directed towards a catcher vessel; and (d) catching the projectile in the catcher vessel.

17. The method of claim 16, wherein said injecting of step (a) is performed by a cylinder actuating through a portion of the launcher to inject the projectile into the convey line.

18. The method of claim 16, wherein the catcher vessel comprises an exhaust system for regulating and filtering air exhausted from the catcher vessel.

19. The method of claim 16, wherein at least a portion of the steps are automated.

20. A cleaning system for cleaning a pneumatic conveyance system used to transport particulate material, wherein the pneumatic conveyance system includes a material-introduction device for introducing particulate material into a convey line, and a motive air source for generating an air flow to propel the particulate material through the convey line, wherein the cleaning system comprises:

a projectile comprising a cleaning surface for cleaning an interior of the convey line as said projectile travels through the convey line;

a launcher for injecting said projectile into the convey line, wherein said launcher is coupled with the convey line at a position upstream from the material-introduction device;

a catcher vessel for receiving said projectile upon said projectile exiting the convey line;

an isolation valve positioned downstream of the material-introduction device for fluidly isolating portions of the convey line upstream and downstream from said isolation valve;

a first air source associated with said launcher for propelling said projectile through a first portion of the convey line; and a second air source associated with said isolation valve for propelling said projectile through a second portion of the convey line.

21. The system of claim 20, wherein said first air source and said second air source are supplied by a common air source.

22. The system of claim 21, wherein said common air source is an air pump.

* * * * *